(12) United States Patent
Suzuki

(10) Patent No.: US 7,365,966 B2
(45) Date of Patent: Apr. 29, 2008

(54) ELECTRONIC DEVICE

(75) Inventor: Takahiro Suzuki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 283 days.

(21) Appl. No.: 11/221,251

(22) Filed: Sep. 7, 2005

(65) Prior Publication Data

US 2006/0087807 A1 Apr. 27, 2006

(30) Foreign Application Priority Data

Oct. 22, 2004 (JP) .............................. 2004-307943

(51) Int. Cl.
*H01G 5/01* (2006.01)
*H05K 5/00* (2006.01)
*H05K 7/00* (2006.01)
*G06F 1/16* (2006.01)
*G08B 3/00* (2006.01)
*G08B 5/00* (2006.01)

(52) U.S. Cl. .................... 361/679; 361/288; 361/680; 340/330

(58) Field of Classification Search ............... 361/679, 361/288, 680, 686; 116/279; 200/520, 530; 340/330

See application file for complete search history.

(56) References Cited

U.S. PATENT DOCUMENTS 2,977,433 A * 3/1961 Beiser et al. ........... 200/38 FB
4,394,546 A * 7/1983 Harumatsu .................. 200/5 R

FOREIGN PATENT DOCUMENTS

JP 2004-179241 * 6/2004

* cited by examiner

*Primary Examiner*—Jayprakash Gandhi
*Assistant Examiner*—Anthony M Haughton
(74) *Attorney, Agent, or Firm*—RatnerPrestia

(57) ABSTRACT

An electronic device has an operating panel. A through-hole penetrating the operating panel is provided at a part of the operating panel. A partition board includes a board part and a partition part, and a step is provided between the board part and the partition part. In an area where the through-hole and the board part of the partition board are to be formed, a metal mold can be thickened. In an area where a narrow gap on a surface side of the operating panel is to be formed, the length of the metal mold can be reduced. Therefore, the strength of the metal mold can be maintained. Also, the step of the partition board, which separates the board part and the partition part, prevents visual recognition of the through-hole by a user.

6 Claims, 4 Drawing Sheets ns ELECTRONIC DEVICE

BACKGROUND OF THE INVENTION

1. Field of the Invention

This invention relates to an electronic device having plural operating buttons that are continuously arrayed.

2. Description of the Related Art

A conventional electronic device is disclosed, for example, in JP-A-2004-179241. The conventional electronic device has a front panel. A button insertion recess, a recording medium insertion hole and the like are formed on the front panel. In the button insertion recess, plural buttons for operating the device are inserted. Insertion holes are formed at the bottom of the button insertion recess and button holders are arranged in the insertion holes. Partition walls that separate the plural buttons are formed between the insertion holes. The partition walls are protruding from the bottom of the front panel to the surface of the front panel. These partitions are provided mainly for clarifying the classification of each button function and improving the operability. The partitions function to prevent erroneous operation of the buttons.

FIG. 6A shows a partition board 71 between operating buttons in another conventional device. The partition board 71 is made of resin. A surface is formed one step deeper than an operating panel surface 73, thus providing gaps 72 above and below the partition board 71. In a structure shown in FIG. 6B, a partition board 81 is a separate component from a panel. The partition board 81 and an operating panel surface 82 are connected with each other by fitting parts 83. Gaps 84 are formed in the operating panel surface 82.

The gaps above and below the partition board have the following function. As viewed from the front side of the operating panel, there are gaps between buttons and the panel. The gaps are above and below the buttons. Similarly, gaps are provided above and below the partition board. The width of the gaps above and below the partition board is set to the same dimension as the gaps above and below the neighboring buttons. This dimensional setting enables integrated appearance of the neighboring buttons and is preferable in view of design.

Meanwhile, improved appearance around operating buttons has been demanded of the recent electronic devices. The gaps around the operating buttons tend to be narrower. Therefore, the gaps above and below the partition board must be narrower, too.

However, if the gaps above and below the partition board are narrowed, the following problem arises. Here, it is assumed that the operating panel is made of resin and that the partition board and the operating panel are integrally formed. In this case, narrow grooves are formed in the operating panel. These grooves serve as gaps between the panel and the partition board, and a part of the panel becomes the partition board. It is now assumed that the gaps between the operating buttons and the operating panel are narrowed to a certain extent or more and that the gaps above and below the partition board are accordingly narrowed to the same extent. In this case, to secure the strength of a metal mold used for molding, the depth of the gaps cannot be increased (i.e., narrow and deep grooves cannot be easily prepared). Therefore, the surface in the depth of the gaps can be seen and good appearance in view of design cannot be maintained. If the partition board is a separate component from the panel, narrow and deep gaps can be formed (FIG. 6B). However, the number of components increases and the assembly work become complicated.

SUMMARY OF THE INVENTION

This invention is made in view of the foregoing status of the art. It is an object of this invention to provide an electronic device in which gaps between an operating panel and a partition board can be narrowed while having a shape that maintains the strength of a metal mold used for molding the operating panel, and in which the operating panel and the partition board can be prevented from appearing continuous to each other, thus enabling improved appearance in view of design.

An electronic device according to an aspect of this invention includes a plurality of operating buttons, a button holding part that holds the plurality of operating buttons so that the buttons can move in a pressing direction, a wall part integrally formed with the button holding part and having a through-hole provided therein, and a partition board provided at least between one operating button of the plurality of operating buttons and another operating button next to the one operating button, wherein the partition board has a partition part having substantially the same height as the height of the foregoing at least one button, and a board part forming a part of a circumferential edge of the through-hole, and wherein the partition board is integrally formed with the wall part.

An electronic device according to an aspect of this invention includes a plurality of operating buttons, and an operating panel on which the plurality of operating buttons are provided. The operating panel has a vertical wall part that crosses a moving direction of the buttons, and a partition board that extends forward from the wall part between a first operating button and a second operating button of the plurality of buttons. The first operating button, the second operating button and the partition board have gaps of substantially the same size to the operating panel. The partition board has a partition part on forward side and a board part in the depth. A step is provided between the partition part and the board part, and the partition part is protruding from the board part in the direction of height. The wall part has a through-hole that is situated in the depth of the protruding part of the partition part.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DETAILED DESCRIPTION OF THE PREFERRED EMBODIMENTS

Figure 1A:
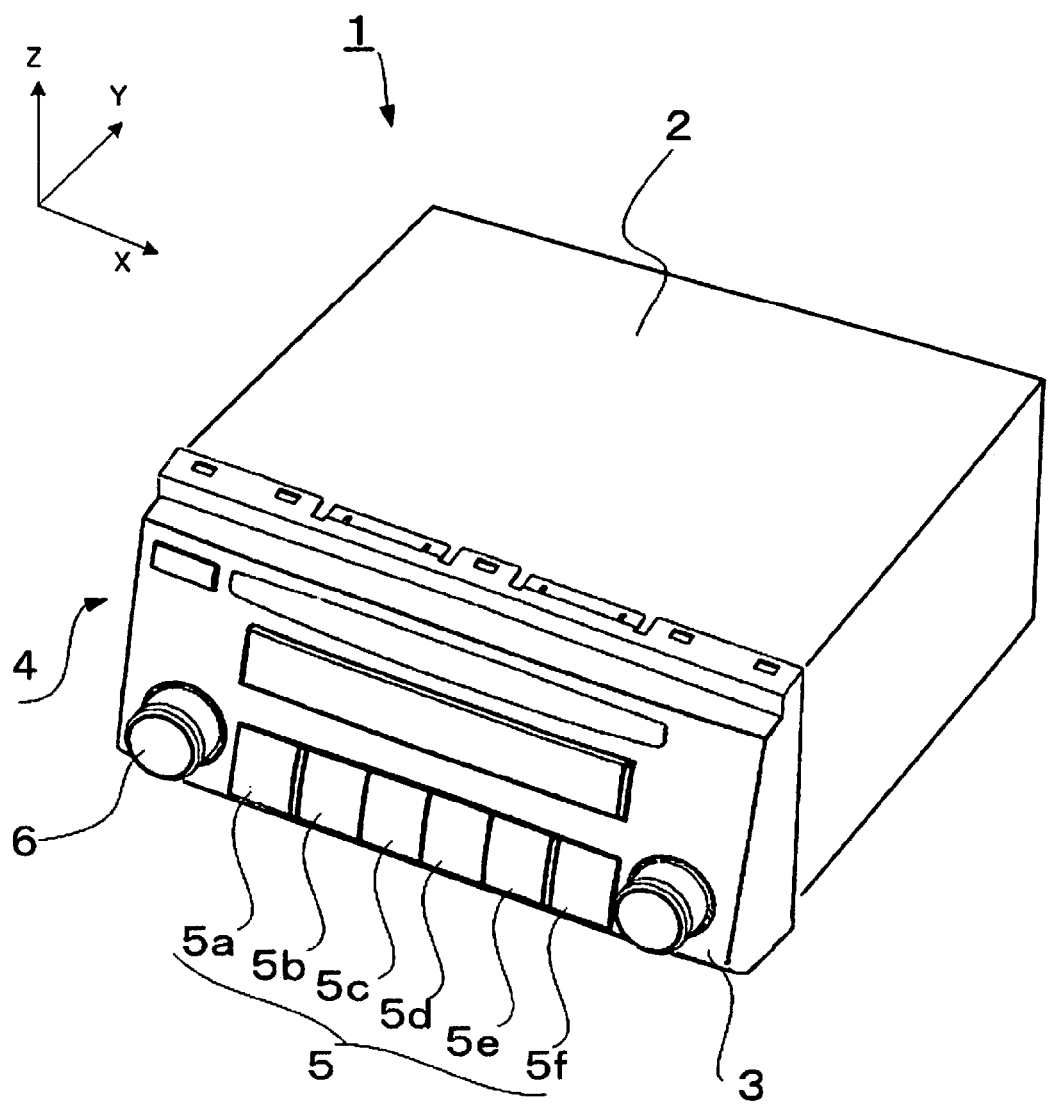
FIG. 1A is a perspective view of an electronic device according to an embodiment.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

This electronic device has plural operating buttons, a button holding part that holds the plural operating buttons so that the buttons can move in a pressing direction, a wall part integrally formed with the button holding part and having a through-hole provided therein, and a partition board provided at least between one operating button of the plural operating buttons and another operating button next to the one operating button. The partition board has a partition part having substantially the same height as the height of at least one button, and a board part forming a part of a circumferential edge of the through-hole. The partition board is integrally formed with the wall part.

With this structure, even when the gap between the operating panel and the partition board is narrowed, it is possible to realize a panel shape that can maintain the strength of a metal mold used for integrally forming the operating panel and the partition board. That is, the gap between the operating panel and the partition board can be reduced, using the panel shape that can maintain the strength of the metal mold. Moreover, the operating panel and the partition board can be prevented from appearing continuous to each other, thus improving the appearance in view of design.

In this electronic device, the wall part may be a retaining wall that limits movement of the operating buttons in the pressing direction. With this structure, a member having a pressing regulation function for the operating buttons, which is an essential function, is provided without providing particularly another wall parts having a through-hole. Therefore, the number of components can be reduced.

In this electronic device, the length of the partition part of the partition board in direction of depth may be equal to or longer than a pressing stroke (pressing length) of the operating buttons. With this structure, even if the partition board is exposed outward when the operating buttons are pressed, only the part of the same height (that is, the partition part) is exposed. That is, the lower part (board part) in the depth of the partition board is not exposed. Therefore, good appearance can be maintained even when pressing the operating buttons.

Moreover, the partition part may protrude forward more than the foregoing at least one button. Alternatively, the foregoing at least one button may protrude forward more than the partition part. With such a structure, the operating buttons and the partition board can be distinguished more clearly. Therefore, the erroneous operation prevention function in the case where the user operates the electronic device without watching the electronic device can be further improved.

This electronic device is useful when the gap around the operating buttons in the operating part is narrowed. While the operating panel has the shape that can maintain the strength of the metal mold used for molding, the gap between the operating panel and the partition board can be narrowed in accordance with the gap around the buttons. The connecting part between the partition board and the operating surface can be prevented from being seen. Thus, an electronic device having a design of good appearance can be provided.

Hereinafter, an electronic device according to an embodiment of this invention will be described with reference to the drawings.

Figure 1B:
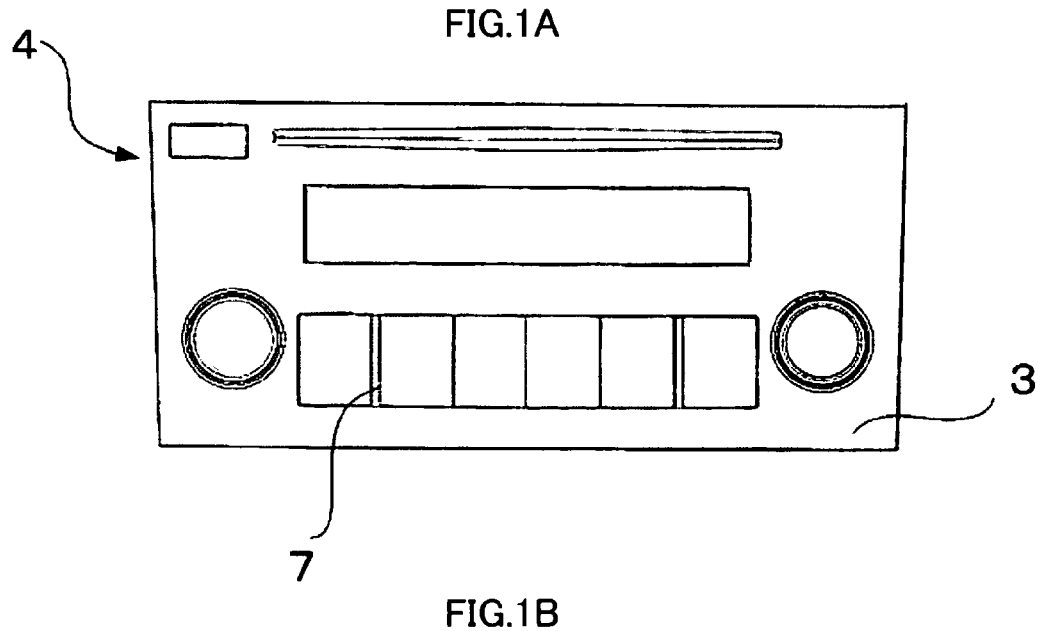
FIG. 1B is a front view of the electronic device according to the embodiment.

FIGS. 1A and 1B show an electronic device according to an embodiment of this invention. In this embodiment, the electronic device is a car audio device.

In the following description, X-direction shown in FIG. 1A is referred to as the direction of width, Y-direction is referred to as the direction of depth, and Z-direction is referred to as the direction of height.

In FIGS. 1A and 1B, a car audio device (electronic device) 1 has a casing 2. Inside the casing 2, a CD deck, a radio tuner, a printed board (substrate) and the like, not shown, are housed. On the printed board, an integrated circuit (IC) for electrically controlling the CD deck, the radio tuner and the like is mounted. An operating panel 3 is fitted with the front part of the casing 2. The casing part deeper than the operating panel 3 is incorporated within a center console of an automobile. When the car audio device 1 is mounted on a vehicle, it appears that an operating part 4 is exposed to the user. The operating part 4 is mounted to achieve integrated appearance with the other indoor panels of the vehicle such as an air conditioner panel.

To operate each function of the car audio device 1, the operator presses plural operating buttons 5 (5*a* to 5*f*) provided on the operating panel 3. The operator also turns a volume operating part 6.

In the case of an in-vehicle electronic device such as the car audio device 1, the user of the device is often the driver of the vehicle. Therefore, it is desired that blind touch on the operating panel should be easy. In this embodiment, the plural operating buttons 5 and the like are held on the operating panel 3 so that these operating buttons 5 can be pressed. A partition board 7 is provided together with these plural operating buttons 5. The partition board 7 facilitates tactile recognition of the layout of the operating buttons 5 and it plays the role of preventing erroneous operations. Also, the functions of the buttons are divided by the partition board 7. For example, the operating button 5*a* has a function of switching the mode between a radio mode, a CD reproduction mode, a cassette reproduction mode and the like. The mode is switched every time the operating button 5*a* is pressed. The operating buttons 5*b* to 5*e* are separated from the operating button 5*a* by the partition board 7. In the radio mode, each of the operating buttons 5*b* to 5*e* has a radio station selection function. In the CD reproduction mode, each of the operating buttons 5*b* to 5*e* has an instruction function to instruct execution of fast-forward, rewind or the like. In the other modes, the buttons 5*b* to 5*e* have their respective functions. The partition board 7 thus contributes to improvement in operability and prevention of erroneous operations.

The operating part 4 of the car audio device 1 constructed as described above will now be described in detail with reference to FIGS. 2, 3A, 3B and 4.

Figure 2:
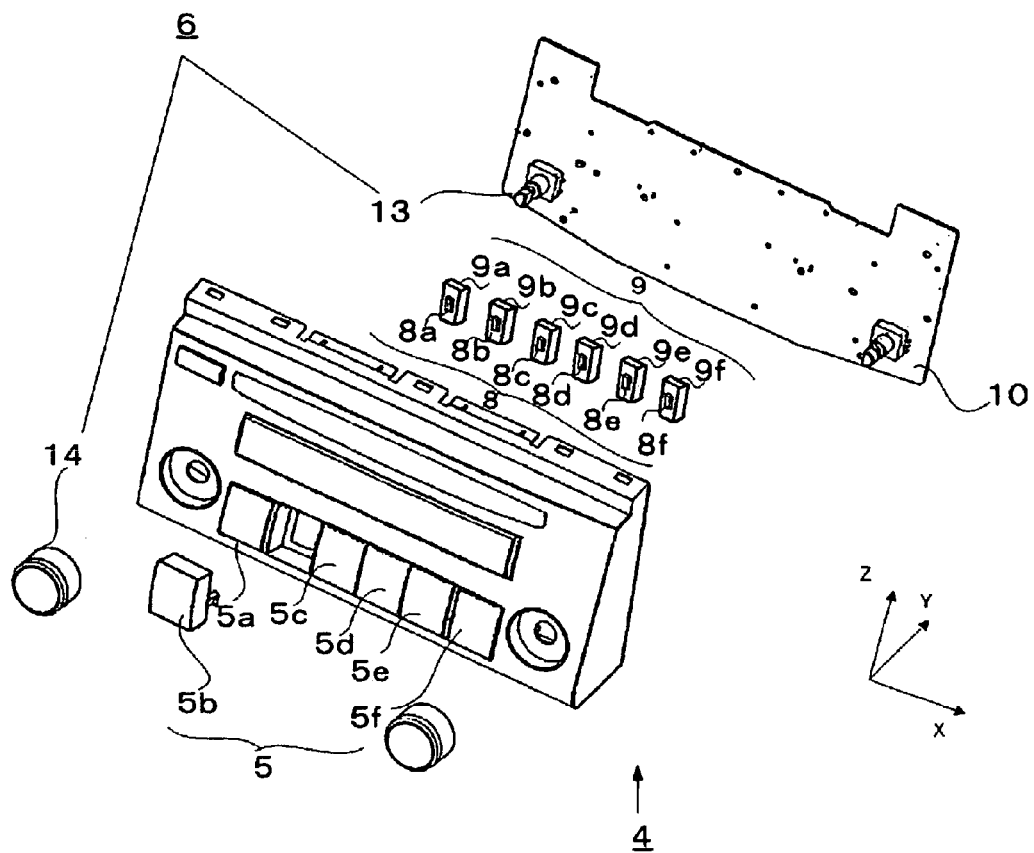
FIG. 2 is an exploded perspective view of an operating part of the electronic device.

In FIG. 2, the operating part 4 includes the operating panel 3, switches 9, an operating board (substrate) 10 and the like. These are arranged from the forward side into the direction of depth. The operating panel 3 holds the plural operating buttons 5. The switches 9 are situated in the pressing direction of the operating buttons 5 (substantially the same direction as the direction of depth). The switches 9 are provided with switch pressing parts 8. An electronic circuit is mounted on the operating board (substrate) 10. As one of the switch pressing parts 8 is touched, the circuit is electrically continued and an operation signal is generated. Thus, the function of the car audio device 1 is executed as instructed by the operation of the button.

Figure 3A:
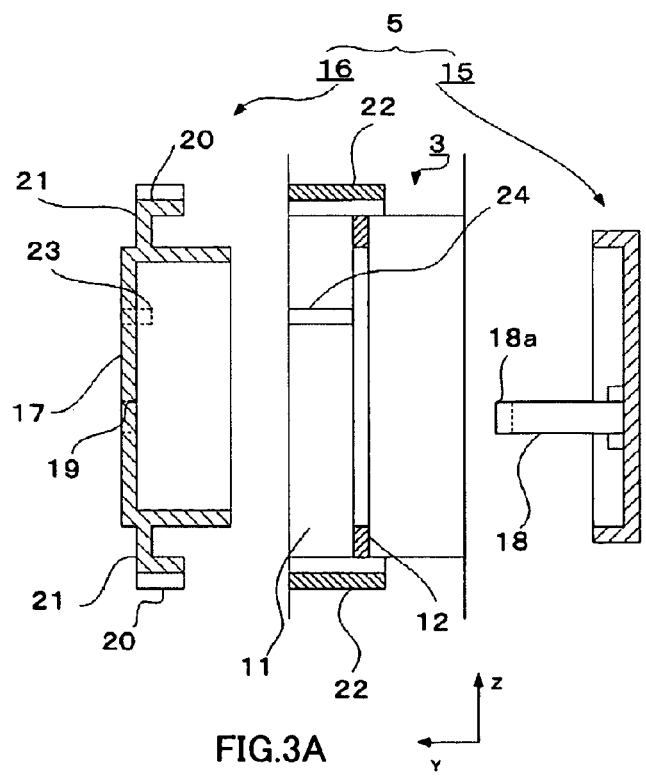
FIG. 3A is a sectional view showing a structure of an operating button of the electronic device.

The plural operating buttons 5 are engaged or fitted with a button holding part 11 formed in the operating panel 3 (see FIG. 3A). The plural operating buttons 5 are held on the operating panel 3 and can move in the pressing direction. In the depth in the direction of the depth of the button holding part 11 (that is, the casing 2 side), a retaining wall 12 is provided. The retaining wall 12 limits the movement of the buttons in the pressing direction. The retaining wall 12 prevents the operating buttons 5 from going through the button holding part 11 when the operating buttons 5 are pressed.

It is now assumed that the operator pressed one of the operating buttons 5. For example, the operating button 5 is pressed with a finger. The operating button 5 presses the switch pressing part 8 of the switch 9 situated below that operating button 5. The switch pressing part 8 moves against the elastic force of an elastic member, not shown, within the switch 9, and thus causes a short circuit of wiring on the rear side. After that, the operator cancels the pressing of the operating button 5. For example, the finger is removed from the operating button. The elastically deformed elastic member generates a repulsive force to restore the state before the pressing. This repulsive force causes the operating button 5 to move back to the forward side of the operating panel 3 along the button holding part 11. Here, the retaining wall 12 regulates the movement of the operating button 5 so that the button will not excessively move back toward the forward side.

The operating board 10 has components and the like for generating instruction signals to operate each function of the car audio device 1. These components are connected with each other by printed wiring. In this embodiment, the wiring printed on the operating board 10 has an open end. A voltage of several volts is applied to its one end and the other end is grounded to the ground level. The switch pressing part 8 causes a short circuit of the wiring on the rear side against the elastic force of the elastic member, not shown, in the switch 9. Interlocked with the pressing of the button, the opening end forms a short circuit. The signal level of the operation instruction signal changes. This change in the signal level is detected and various operation functions are executed.

The operating board 10 also has an illumination component (not shown) such as LED or lamp to illuminate each button. The volume operating part 6 is also mounted on the operating board 10. The volume operating part 6 is provided for turning on/off the power of the car audio device 1, adjusting the volume, selecting a radio station, adjusting the sound quality, and the like. The volume operating part 6 includes a supporting shaft 13 that applies a rotational force, and a volume cap 14. The supporting shaft 13 penetrates a hole in the operating panel 3, and the volume cap 14 is fitted with the supporting shaft 13.

Figure 3B:
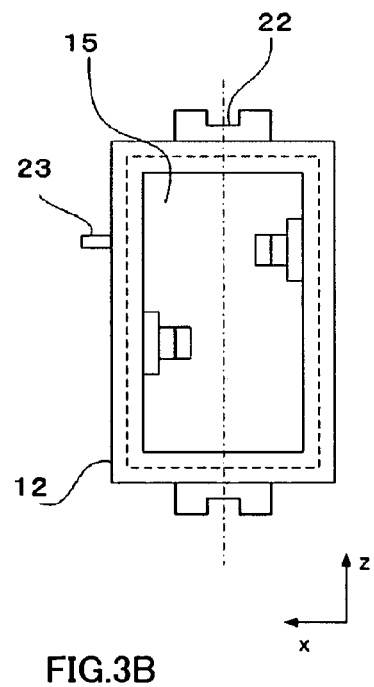
FIG. 3B is a rear view showing the structure of the operating button of the electronic device.

Next, the button holding part 11 will be described. The button holding part 11 is integrally formed with the operating panel 3. FIG. 3A is a sectional view of an operating button 5 (one of operating buttons 5a to 5f). In FIG. 3A, the button is cut on a plane passing the center in the direction of width and extending in the direction of height. FIG. 3B is a view showing the operating button and its peripheries shown in FIG. 3A, as viewed from the rear side of the operating panel. In FIG. 3A, the operating button 5 includes a button cap 15 and a pressing piece 16. The button cap 15 and the pressing piece 16 are situated on both sides of the retaining wall 12 provided in the operating panel 3. The button cap 15 is on the forward side in the direction of depth and therefore arranged on the side that can be seen by the user. The pressing piece 16 is arranged in the depth in the direction of depth of the operating panel 3. The pressing piece 16 has a pressing surface 17. The pressing surface 17 can contact the switch pressing part 8 situated in the depth in the direction of depth of the pressing piece 16.

The button cap 15 is provided with an engagement protrusion 18. The pressing piece 16 is provided with an engagement hole 19. The engagement protrusion 18 is an elastic member and an engagement pawl 18a is provided at the distal end of the engagement protrusion 18. The engagement protrusion 18 passes through the through-hole in the operating panel 3 and becomes engaged with the engagement hole 19. The button cap 15 and the pressing piece 16 are thus assembled together and become integrally movable.

The button holding part 11 is provided mainly in the depth in the direction of depth of the retaining wall 12. The pressing piece 16 is provided with upper and lower holding protrusions 21. The upper and lower holding protrusions 21 are provided at upper and lower parts of the pressing piece 16 in the direction of height. The upper and lower holding protrusions 21 have upper and lower guide grooves 20, respectively. The button holding part 11 has upper and lower guide rails 22 at positions corresponding to the upper and lower holding protrusions 21. The upper and lower guide rails 22 are provided into the direction of depth. When the pressing piece 16 is engaged with the button cap 15, the upper and lower guide rails 22 are fitted in a slidable manner in the upper and lower guide grooves 20 of the upper and lower holding protrusions 21. Thus, the operating button 5 is held on the operating panel 3 with respect to the direction of height in the state where the operating button 5 is movable in the direction of depth. Similarly, the operating button 5 is held by the button holding part 11 with respect to the direction of width. The pressing piece 16 has left and right guide rails 23. The left and right guide rails 23 are provided on the left and right sides, respectively, in the direction of width of the pressing piece 16. The button holding part 11 has left and right guide grooves 24 at positions corresponding to the left and right guide rails 23. The left and right guide grooves 24 are provided into the direction of depth. When the pressing piece 16 is engaged with the button cap 15, these left and right guide rails 23 are fitted in a slidable manner in the left and right guide grooves 24, respectively. Thus, the operating button 5 is held on the operating panel 3 with respect to the direction of width in the state where the operating button 5 is movable in the direction of depth.

As the pressing piece 16 is held in a slidable manner by the button holding part 11, the integrated component formed by the button cap 15 and the pressing piece 16 engaged with each other (that is, operating button 5) is held in a slidable manner in the direction of depth (that is, pressing direction). However, the retaining wall 12 provided in the operating panel 3 is formed to abut against the outer circumference of the button cap 15. The retaining wall 12 prevents the operating button 5 from moving more than necessary into the direction of depth. Even when the operator strongly presses the operating button 5, the operating button 5 can be prevented from falling off the operating panel 3.

In the above description, the button holding part 11 is integrally formed with the operating panel 3. However, the upper and lower guide rails 22, the left and right guide rails 23, the upper and lower guide grooves 20, the left and right guide grooves 24 and the like may be attachable/detachable. An appropriate structure may be employed in consideration of the validity of product design, easiness in manufacturing, cost and the like.

Next, the partition board 7 will be described in detail with reference to FIG. 4. As described above, the partition board 7 separates a desired operating button and an operating button situated next to this button of the plural operating buttons 5 held in the button holding part 11.

Figure 4:
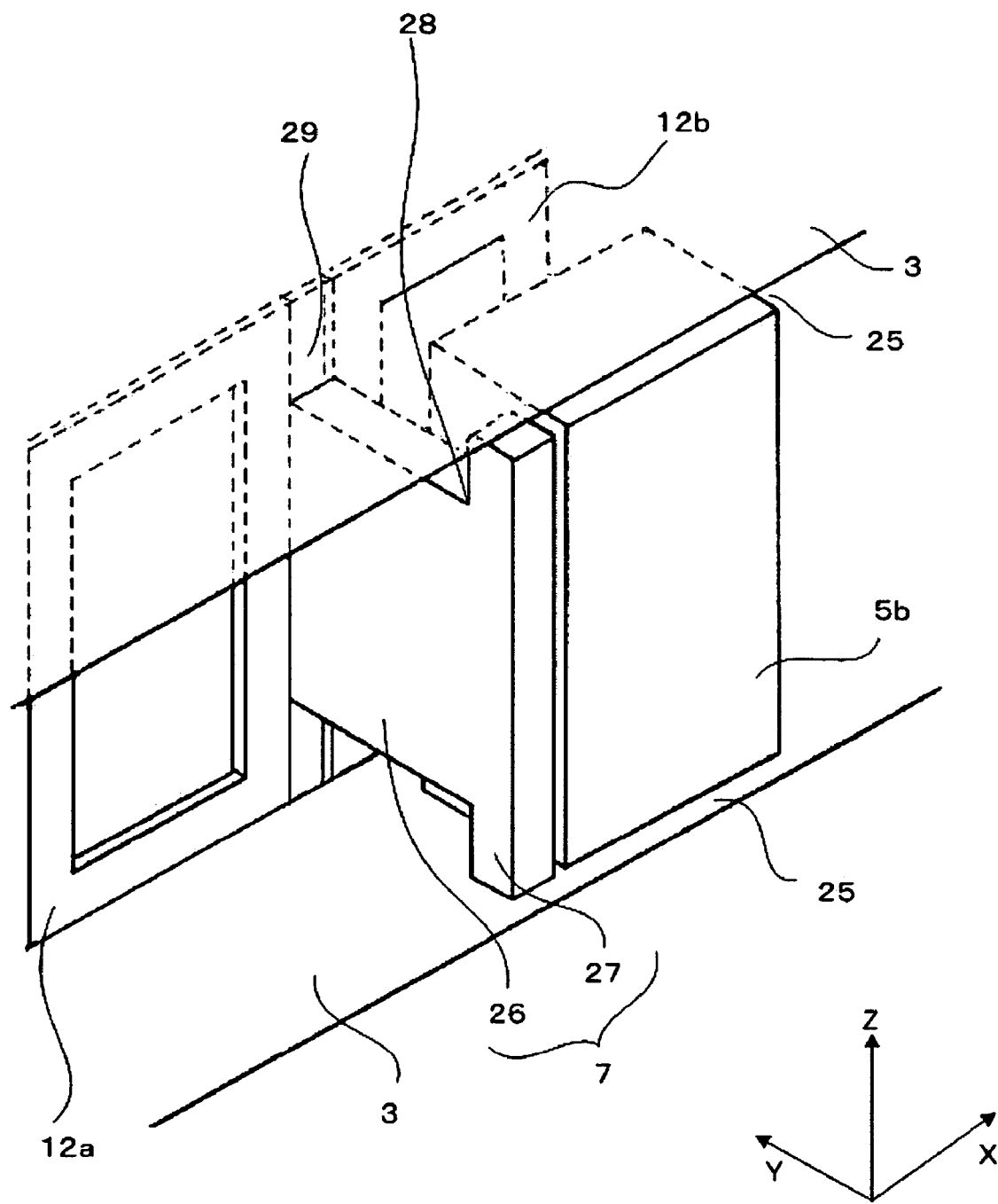
FIG. 4 is a perspective view showing a structure of a partition board of the electronic device.

FIG. 4 is a perspective view schematically showing the positional relation between the operating button 5, the button holding part and the partition board 7. In FIG. 4, the button holding part, the retaining wall 12 and the partition board 7 are integrally formed with the operating panel 3.

Above the top surface of the operating button 5, a part of the operating panel 3 is provided substantially parallel thereto. This panel part is arranged like a roof of the operating button 5 and the panel part covers the top surface of the operating button 5. A small gap 25 in the direction of height is provided between the top surface of the operating button 5 and the operating panel 3. Also below the bottom surface of the operating button 5, a part of the operating panel 3 is similarly arranged. A small gap 25 is provided between the bottom surface of the operating button 5 and the panel part. Moreover, the operating panel 3 has the retaining wall 12 in the depth in the direction of depth of the operating button 5. These three board parts (the upper and lower panel boards and the retaining wall 12 in the depth) form a panel recess part in the operating panel 3. The panel recess part is formed by the three bent boards (walls). The sectional shape of the panel recess part is a U-shape that is turned sidelong (with each corner having a right angle). The panel recess part has an open part on the forward side in the direction of depth.

The length (depth) of the panel recess part in the direction of depth is approximately equal to the sum of the thickness of the button cap 15 and the button stroke (pressing length). The thickness of the button cap 15 is the dimension in the direction of depth. The button stroke is the distance that is moved when the operating button 5 is pressed. The switch 9 is arranged in the depth in the direction of depth of the operating panel 3 and the operating button 5. The plural switches 9 are provided corresponding to the plural operating buttons 5. The elastic force of each switch 9 is transmitted by the switch pressing part 8 and thus biases each operating button 5. This realizes integrated appearance on the surface of the operating part 4.

The retaining walls 12a, 12b are situated corresponding to the neighboring operating buttons 5a, 5b, respectively. The partition board 7 is protruding forward in the direction of depth from the area between the retaining walls 12a, 12b.

The partition board 7 includes a board part 26 and a partition part 27. The board part 26 is a specific part in the depth in the direction of depth of the partition board 7. The partition part 27 is a specific part on the forward side in the direction of depth of the partition board 7. The board part 26 and the partition part 27 are integrated with each other. The height of the board part 26 is set to be lower than the height of the partition part 27.

More specifically, a step 28 is provided at a predetermined position in the direction of depth of the partition board 7. The step 28 is the boundary between the board part 26 and the partition part 27. The board part 26 is behind the step 28, and the partition part 27 is on the forward side of the step 28.

The step 28 causes the partition part 27 to be higher than the board part 26. In other words, the partition part 27 is protruding upward from the board part 26.

The shape of the partition board 7 is vertically symmetrical and the partition board 7 has the same structure in its upper and lower parts. Also in the lower part of the partition board 7, the partition part 27 is protruding with respect to the board part 26. The partition part 27 is downwardly longer (higher) than the board part 26. The panel shape or the like around the partition board 7 has the same structure in its upper and lower parts. In the following description, the structure of the upper part of the partition board 7 will be mainly described. However, the same structure can be seen in the lower part, too.

The height of the partition part 27 is set to be substantially the same as the height of the operating buttons 5 next to the partition board 7. This height represents the vertical position as viewed from the front. The operating buttons 5 and the partition part 27 are provided very closely to the upper and lower surfaces of the above-described panel recess part via substantially the same gap 25. This realizes integrated appearance of the partition part 27 and the operating buttons 5, thus improving the appearance in view of design.

The position of the step 28 of the partition board 7 is set to be deeper in the direction of depth than the surface position of the operating buttons 5 in the state where the operating buttons 5 are pressed to the deepest point. As the position of the step 28 is set in this manner, when the operating button 5 is pressed, the step 28 between the partition part 27 and the board part 26 cannot be seen and the board part 26 is not exposed. Even when the operating part 4 is seen from a position obliquely deviated from the front of the car audio device 1, the step 28 cannot be seen. Therefore, good appearance of the car audio device 1 in view of design can be maintained.

A through-hole 29 is formed between the retaining wall 12 and its neighboring retaining wall 12 and on upper and lower sides in the direction of height of the board part 26. Parts of the closest sides of the neighboring retaining walls 12a, 12b and the upper side and/or lower side of the board part 26 form the circumferential edge of the through-hole 29.

The major part of the through-hole 29 exists at a position overlapping the partition part 27 as viewed from the front side of the operating panel 3. More specifically, the partition board 7 is protruding from the board part 26 in the direction of height (upwardly and downwardly). The through-hole 29 is situated behind this protruding part along with the direction of depth. The through-hole 29 thus overlaps the partition part 27. Therefore, when the car audio device 1 in ordinary use is seen from the front, the through-hole 29 can hardly be seen. The gaps 25 above and below the partition board 7 are recognized as partitions that separate the partition board 7 and the operating buttons 5 from the operating panel 3.

The through-hole 29 need not be provided at the two positions, that is, the upper and lower sides of the partition board 7. For example, if the lower gap 25 need not be set narrowly in view of design, the through-hole 29 can be provided corresponding only to the upper gap 25.

The partition board 7 is protruding to such an extent that it becomes substantially flush with the surface of the operating panel 3. This realizes its integrated appearance with the surface of the operating panel 3. The partition board 7 also has the function of preventing erroneous operations by the user. Thus, the partition board 7 may be protruding forward in the direction of depth from the surface of the operating panel 3. Alternatively, the partition board 7 may be recessed to the rear side in the direction of depth from the surface of the operating panel 3. Here, the partition board 7 may be protruding or recessed within such a range that it is substantially flush with the surface of the operating panel 3. With such a structure, the user can more easily recognize which part of the operating panel 3 he/she is touching. Therefore, the effect of preventing erroneous operations can be further improved.

Now, a metal mold structure for integrally molding the above-described partition board 7 and operating panel 3 will be described with reference to FIG. 5.

The operating panel 3 in this embodiment is made of resin and is manufactured by integral forming. Two metal molds having recesses and protrusions inside are joined with each other. Then, resin is poured (or injected) into the space within the metal molds to mold the operating panel 3.

Figure 5:
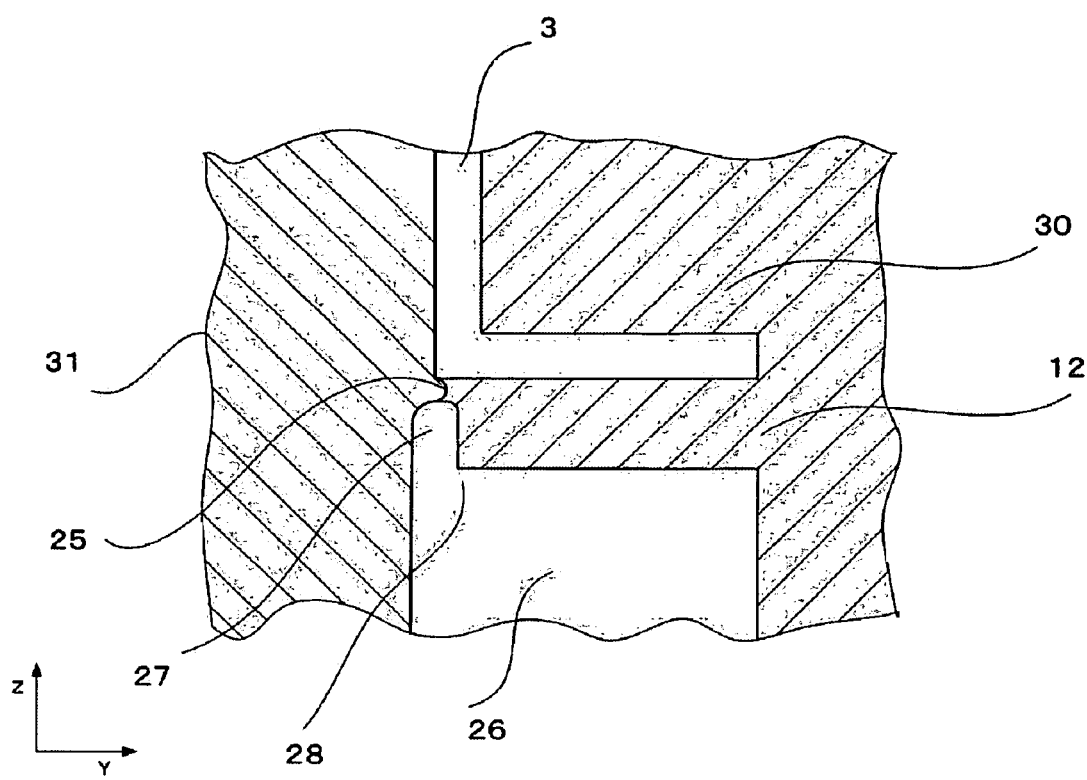
FIG. 5 is a sectional view showing a technique of molding the partition board of the electronic device, and a metal mold.
Figures 6A, 6B:
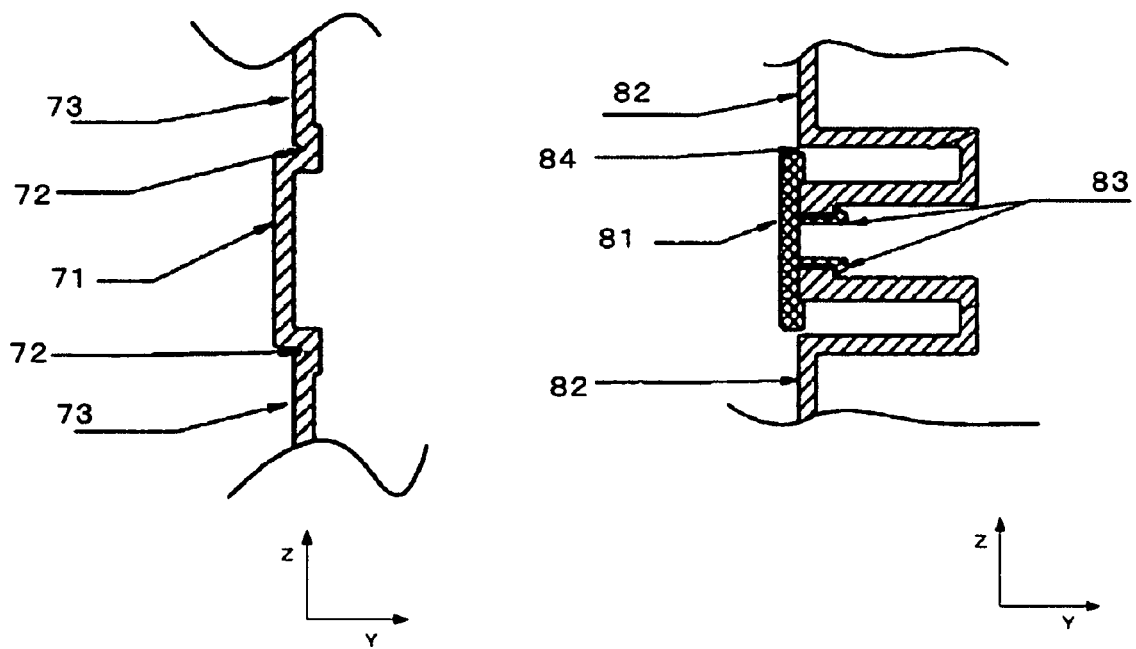
FIG. 6A is a sectional view showing an operating panel in a conventional electronic device.
FIG. 6B is a sectional view showing an operating panel in a conventional electronic device.

FIG. 5 is a sectional view showing the periphery of the partition board 7 when the two metal molds are joined with each other. In FIG. 5, one of the two metal molds is a core metal mold 30 and the other is a cavity metal mold 31. The position of the core metal mold 30 is fixed. The cavity metal mold 31 is movable. The relative positions of the core metal mold 30 and the cavity metal mold 31 can be thus aligned with each other. After the positions of the two molds are aligned, a resin material that has been caused to be liquid at a high temperature is poured therein. The resin material is cooled within the metal molds and the operating panel 3 is thus molded.

In FIG. 5, the shaded parts represent the metal molds and the solid part represents the panel. As already described, the operating panel 3 has the narrow gap 25 between the partition part 27 (partition board 7) and the wall of the panel recess part above the partition part 27. This gap 25 is formed by the distal end part (protrusion) of the cavity metal mold 31. Since the board part 26 is lower than the partition board 27, the gap between the board part 26 and the panel board above it is large. The through-hole 29 of the retaining wall 12 is situated behind this large gap. This part (the large gap and the through-hole 29 behind it) is formed by the core metal mold 30. Moreover, the metal molds are shaped and aligned in position so that the distal end part of the cavity metal mold 31 contacts the distal end part of the core metal mold 30. Thus, in the area where the narrow gap 25 is to be formed, the distal end part of the cavity metal mold 31 can be shortened (its dimension in the direction of depth can be reduced). Also, the gap that should be formed by the core metal mold 30 increases and the metal mold can be thickened.

Now, the metal mold structure will be described further in detail with reference to FIGS. 4 and 5. In this embodiment, the strength of the metal molds can be maintained by improving the shape of the operating panel. First, in the operating panel 3, the partition board 7 has the step 28. Therefore, the partition part 27 is higher than the board part 26 in the direction of height, and the partition part 27 is protruding. The gap 25 above the partition part 27 is small whereas the gap above the board part 26 is large. Also, behind the partition part 27 (protrusion), the through-hole 29 is provided in the retaining wall 12. The through-hole 29 continues to the large gap above the board part 26.

In such a structure, the narrow gap 25 is limited to the area above the partition part 27, that is, it is limited to the area before the step 28. Therefore, the distance of the narrow gap 25 (length or dimension in the direction of depth) is short. This short gap 25 is formed by the protruding part (distal end part) of the cavity metal mold 31. Therefore, the cavity metal mold 31 can secure sufficient strength.

The gap above the board part 26 exists behind the gap 25. This gap is broad. In addition, the through-hole 29 is provided behind this gap. Therefore, the gap above the board part 26 can be formed by the core metal mold 30 on the rear side (instead of the forward metal mold). Moreover, since the gap is broad, the metal mold in this area can be thick. Therefore, also the core metal mold 30 can secure sufficient strength.

In this manner, even when the gap 25 is extremely narrowed, the two metal molds for molding the operating panel 3 can maintain strength and the partition board 7 can be integrally formed with the operating panel 3. Moreover, since the protrusion of the partition part 27 is on the forward side, the through-hole 29 cannot be seen from the front.

In this embodiment, the size (in the direction of height) of the gap 25 can be set in accordance with the size of the gap around the operating buttons 5. The length (dimension) in the direction of depth of the board part 26 can be decided arbitrarily from the strength of the metal molds for molding the operating panel 3.

In the electronic device according to this embodiment, the through-hole 29 penetrating the operating panel 3 is provided at a part of the operating panel 3, as described above. The step is provided on the partition board 7, thus dividing the partition board 7 into the board part 26 and the partition part 27. This enables maintenance of the strength of the metal molds even when a narrow gap is formed on the surface side of the operating panel 3. More specifically, the metal mold can be thickened in the area where the through-hole 29 and the board part 26 of the partition board 7 are to be formed. Also, the length of the metal mold can be reduced in the area where the narrow gap 25 on the surface side of the operating panel is to be molded. Therefore, the strength of the metal mold can be maintained. Moreover, the step 28 of the partition board 7, which separates the board part 26 and the partition part 27, prevents the through-hole 29 from being seen by the user.

In this manner, even if the gap around the operating buttons is narrow, the operating panel 3 and the partition board 7 can be integrally formed with a simple structure. An electronic device in which the connecting part between the partition board and the operating panel is prevented from being seen without increasing the number of components and which has a design of good appearance can be provided.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An electronic device comprising:
   a plurality of operating buttons;
   a button holding part that holds the plurality of operating buttons so that the buttons can move in a pressing direction;
   a vertical wall part integrally formed with the button holding part and having a through-hole provided therein; and
   a partition board provided at least between one operating button of the plurality of operating buttons and another operating button next to the one operating button;
   wherein the partition board has a partition part having substantially the same height as the height of said at least one button, and a board part forming a part of a circumferential edge of the through-hole, and wherein the partition board is integrally formed with the wall part,
   wherein the partition board that extends forward from the wall part and transversely between a first operating button and a second operating button of the plurality of buttons, wherein the partition board has a partition part on a forward side and a board part on a back side, and a step is provided between the partition part and the board part so that the partition part has a protruding part protruding from the board part in the direction of height wherein the vertical height of the partition part is greater than the vertical height of the board part, and the through-hole of the wall part is situated at a side of a back end of the board part in the direction of height and behind the protruding part of the partition part.

2. The electronic device as claimed in claim 1, wherein the wall part is a retaining wall that limits movement of the operating buttons in the pressing direction.

3. The electronic device as claimed in claim 1, wherein the length of the partition part of the partition board in a direction of depth is equal to or larger than a pressing stroke of the operating buttons.

4. The electronic device as claimed in claim 1, wherein the partition part is protruding forward more than said at least one button.

5. The electronic device as claimed in claim 1, wherein said at least one button is protruding forward more than the partition part.

6. An electronic device comprising:
a plurality of operating buttons; and
an operating panel on which the plurality of operating buttons are provided;
wherein the operating panel has
a vertical wall part that crosses a moving direction of the buttons, and
a partition board that extends forward from the wall part and tranversely between a first operating button and a second operating button of the plurality of buttons;
wherein the first operating button, the second operating button and the partition board have gaps of substantially the same size to the operating panel; and
wherein the partition board has a partition part on a forward side and a board part on a back side, and a step is provided between the partition part and the board part so that the partition part has a protruding part protruding from the board part in the direction of height wherein the vertical height of the partition part is greater than the vertical height of the board part, and the wall part has a through-hole that is situated at a side of a back end of the board part in the direction of height and behind the protruding part of the partition part.

* * * * *